US006538781B1

United States Patent
Beierle et al.

(10) Patent No.: US 6,538,781 B1
(45) Date of Patent: Mar. 25, 2003

(54) MULTIMEDIA DISTRIBUTION SYSTEM USING FIBER OPTIC LINES

(76) Inventors: John Beierle, 7 Beacon Hill Dr., Southbury, CT (US) 06488; Jacob Needle, 29 McLane Dr., Dix Hills, NY (US) 11746; Dimitrios Kokkinos, 144-72 37th Ave., Flushing, NY (US) 11354

( * ) Notice: Subject to any disclaimer, the term of this patent is extended or adjusted under 35 U.S.C. 154(b) by 0 days.

(21) Appl. No.: 09/283,400

(22) Filed: Apr. 1, 1999

Related U.S. Application Data (63) Continuation-in-part of application No. 08/806,090, filed on Feb. 25, 1997, now Pat. No. 6,055,077.

(51) Int. Cl.$^7$ ................................. H04J 14/02
(52) U.S. Cl. .................. 359/125; 359/167; 725/129
(58) Field of Search ................. 359/125, 127, 359/128, 167; 725/129

(56) References Cited

U.S. PATENT DOCUMENTS

| | | | |
|---|---|---|---|
| 4,627,105 A | 12/1986 | Ohashi et al. | 455/612 |
| 4,891,694 A | 1/1990 | Way | 358/86 |
| 4,994,909 A | 2/1991 | Graves et al. | 358/86 |
| 5,111,323 A | 5/1992 | Tanaka et al. | 359/139 |
| 5,136,411 A | 8/1992 | Paik et al. | 359/125 |
| 5,202,780 A | 4/1993 | Fussganger | 359/125 |
| 5,221,983 A | 6/1993 | Wagner | 359/125 |
| 5,309,564 A | 5/1994 | Bradley et al. | 395/200 |
| 5,387,927 A | 2/1995 | Look et al. | 348/6 |
| 5,457,560 A | 10/1995 | Sharpe et al. | 359/137 |
| 5,483,277 A | 1/1996 | Granger | 348/6 |
| 5,517,232 A | 5/1996 | Heidemann et al. | 348/7 |
| 5,969,836 A | * 10/1999 | Foltzer | 359/114 |

OTHER PUBLICATIONS

1997—Ogura et al, "Launch of 'CATV Video Distribution Service' over FTTH", *NTT Review*, vol. 9, No. 6, Nov. 1997, pps. 104–112.

Hiroshige Ogura, Takeo Toide, Hisatoshi Miyazaki, Satoru Sugimoto and Akihisa Sonoda, Launch of *"CATV Video Distribution Service" over FTTH*, NTT Review, Nov. 1997, vol. 9, No. 6, pp. 104–112.

* cited by examiner

*Primary Examiner*—Kinfe-Michael Negash
(74) *Attorney, Agent, or Firm*—Leonard C. Suchyta; Loren C. Swingle; Michael P. Straub (57) ABSTRACT

A system for distributing multimedia information from a central office to a plurality of customer's premises each interconnected to the central office with a dedicated optical fiber includes a switch for transmitting a plurality of optical bands from the central office to each of the subscriber premises. The switch, being located in the central office and controlled by selection signals provided to or by the central office, selects a subset of first signals, either electrical or optical, and blocks others of the signals that are not contained within the subset so that the customer receives only the signals subscribed to by the customer. Each customer's premises has a receiver, coupled to the corresponding dedicated fiber, to detect the subset desired by the customer. Moreover, the system is arranged to transmit customer-specific signals in a downstream direction to the receiver, with each receiver being arranged to propagate upstream signals which are the counterparts to the customer-specific signals.

60 Claims, 8 Drawing Sheets

MULTIMEDIA DISTRIBUTION SYSTEM USING FIBER OPTIC LINES

RELATED APPLICATIONS

This application is a continuation in part of pending application Ser. No. 08/806,090, filed Feb. 25, 1997, which issued as U.S. Pat. No. 6,055,077.

FIELD OF THE INVENTION

The present invention relates to a multimedia system which distributes information from a central location, such as a central station or central office, to one or more subscribers, and in particular, to a switchable system which selectively distributes information to each of the subscribers from the central location.

BACKGROUND OF THE INVENTION

With increasing bandwidths available on fiber optic communication paths, information providers are now capable of delivering a broader range of information, i.e., high definition video, to a subscriber premises. However, even with advancements in optical fiber telecommunication technology, theft of services remains a growing concern among information providers (e.g., cable television). The problem involves the fact that once a central station distributes signals in a general manner to a subscriber premises, the central station loses control of the signals. As a result, such signals are exposed to theft which results in a loss of revenue.

Presently, one approach to remedy the theft problem is to transmit scrambled signals or channels to each subscriber's premises. Each subscriber premises is equipped with a smart set top box to descramble those signals or channels ordered by the subscriber. Such systems however require additional equipment, specifically scramblers and descramblers, which increases their overall cost. Moreover, intelligent set top boxes that permit theft of services are presently available on the black market. Such set tops are capable of descrambling all scrambled signals transmitted to the subscriber premises, thereby allowing the subscriber access to those signals or channels.

Another approach to remedy the problem is found in U.S. Pat. No. 4,994,909 (Graves et al., hereinafter Graves). Graves provides a video signal distribution system that includes a services switching device and an optical network interface (ONI) for selecting particular signals for delivery to a subscriber. The services switching device employs multiplexers for producing time-division multiplexed (TDM) signals. Because the processing and routing of TDM signals is typically accomplished utilizing electronics, a drawback of the Graves system is a need for optical-to-electrical and electrical-to-optical conversion and for controlled environmental vaults, power back-up and maintenance.

A better multi/demultiplexing technique that employs optical rather than electrical multiplexing involves the utilization of wavelength division multiplexing (WDM). WDM provides significant advantages over TDM. Specifically, wavelength multiplexed channels can be separated and combined passively, independently of the format and bit rate of the data being transferred. An example of a fiber optic subscriber loop architecture utilizing WDMs is found in U.S. Pat. No. 5,221,983 (Wagner). However, such subscriber-type systems employing WDMs neither provide or suggest any mechanism for selecting particular signals for delivery to a subscriber premises.

Accordingly, it is an object of the present invention to provide a fiber optic subscriber loop architecture, based on WDM techniques, which is capable of selectively transmitting only those bands ordered by the subscriber to the subscriber premises.

It is a further object of the invention to eliminate the need for scramblers and descramblers at the subscriber premises and, thus, reduce the overall cost of the system.

Another object of the invention is to prevent theft of information services.

Besides the aforementioned shortcomings and limitations of the prior art, the subject matter of the present invention also addresses methodologies and concomitant circuitry for overcoming the limitations and deficiencies relating to wideband transmission to the subscriber premises, especially wideband digital services. In providing these services, the information destined for the subscribers is digitally encoded, typically using the MPEG or MPEG-2 (Moving Pictures Expert Group) standard, and propagated as a digital stream over the transmission medium; digital encoding is deployed to effectively utilize the bandwidth of the medium. Because of the front-end encoding, the receiver at each customer premises requires a digital decoder to reconstruct the original information. Moreover, if two-way or bi-directional communication is desired, then the equipment at the customer premises must be arranged with a digital encoder. The decoding/encoding required by the customer's equipment is expensive. Moreover, it is virtually impossible with such an arrangement to deliver tailored services, that is, subscriber-dependent services, to each individual subscriber.

To overcome the limitations of encoded digital propagation, some recently devised systems focus on non-encoded propagation so that the subscriber's TV may be used in the conventional manner to receive the transmitted signals. Representative of such technology using a single-fiber for a transmission medium is a system for propagating a plurality of downstream video channels over the single fiber in combination with two-way interactive telephony communications over the same fiber, as disclosed in the article entitled "Launch of 'CATV Video Distribution Service' over FTTH", authored by H. Ogura et al and published in the NTT Review, Vol. 9, No. 6, November 1997. As described in this article, two or more communications channels are delivered over a single optical fiber from a head-end to a subscriber's home to effect fiber-to-the-home (FTTH) service. In general, the design philosophy for this system is one of separating downstream video from interactive, non-video communications, that is, propagating the downstream video at one wavelength (namely, 1.5 micrometers) and the interactive telephony communications at a second wavelength (namely, 1.3 micrometers). Moreover, th.is bidirectional telephony arrangement uses TCM (time compression multiplexing) in the so-called "ping-pong" communication mode, wherein all downstream receivers detect the same signal, and each upstream communication from a given subscriber is assigned a unique time slot.

In particular, each subscriber is directly connected to the head-end with a dedicated fiber so every customer receives the same downstream signal broadcast from the head-end, that is, there is no ability to deliver to a given subscriber selected ones of the video channels composing the propagated downstream signal; such an arrangement is typically referred to as a "tree-and-branch" delivery system. Consequently, there is the potential for fraudulent use of the services as alluded to above. In addition, to derive the signal for the subscribers, a number of signal splitters are deployed.

This means that the signal delivered to front-end of the cascade of splitters must have a high power level; high power components tend to be more costly.

Moreover, the system was designed to be implemented on already existing 1.3 micrometer zero-dispersion fibers to reduce implementation costs, but the downstream video utilizes the 1.5 micrometer wavelength for propagation. When a 1.5 micrometer optical wavelength is transmitted through a 1.3 micrometer zero-dispersion fiber, fiber dispersion induces a degradation with a concomitant deterioration in video quality. Consequently, the system must be arranged with dispersion compensation, which adds to the complexity and cost.

Also, the types of interactive services taught or suggested by this reference are existing services such as POTS and narrowband ISDN. There is no teaching or suggestion of using the interactive services part of the system (1.3 micrometer wavelength) for video, especially video conferencing, or wideband data. In brief, the system of Ogura et al separates video (downstream at 1.5 micrometers) from telephony (upstream and downstream at 1.3 micrometers) using a tree-and-branch delivery system for downstream transmission. This is in contrast to the present inventive subject matter, wherein the wavelength assignments are characterized as separating downstream from upstream, irrespective of the content of the downstream or upstream signals, and the system is arranged as a "star-delivery" system.

Thus, another object of this invention is to implement an embodiment which switches electrical signals as an alternative to an embodiment which switches optical signals.

It is still another object of the invention to house components sensitive to the environment in well-controlled environments such as a central office or a customer's premises.

Yet another object is that of configuring a "star-delivery" system between the central location and each customer premises.

SUMMARY OF THE INVENTION

These shortcomings as well as other limitations and deficiencies are obviated, in accordance with the present invention, by a system which utilizes a dedicated fiber optic cable interconnecting a customer's premises to a central location to propagate a downstream optical signal derived from a plurality of signals, either electrical or optical depending upon the embodiment, that are switched at the central location, the signals selected being only those signals subscribed to by the customer.

Briefly, in accordance with one broad system aspect of the present invention, the system for communicating between each particular customer and the central location over the dedicated fiber includes: (a) an electrical switch, at a central location, for selecting only those signals subscribed to by each subscriber, the electrical switch operating in response to control signals available at the central location; (b) an electrical-to-optical converter to generate an optical downstream signal from the selected electrical signals for propagation over the single fiber; and (c) an optical-to-electrical converter for converting the downstream optical signal delivered by the single fiber to received versions of the original electrical signals.

Moreover, bi-directional communications is effected by further arranging the system for transmitting second electrical signals between the central location and the customer's premises, the electrical-to-optical converter being adapted for receiving the second electrical signals at its input and for changing the downstream optical signal in correspondence to the second electrical signals, and the optical-to-electrical converter being adapted for converting the detected downstream optical signal into second electrical received versions of the second electrical signals for use by the customer. For upstream communication to complete the bi-directional operational mode, the system is arranged with an upstream electrical-optical converter, at the customer's premises, for converting third electrical signals into an upstream optical signal, and for transmitting the upstream optical signal over the optical fiber at a second optical wavelength, and wherein the central location further includes an upstream optical-electrical converter for detecting the upstream optical signal and for converting the upstream optical signal to detected electrical versions of the third electrical signals. Typically the third electrical signals are the counterparts to the second electrical signals which, when paired, effect the bi-directional communication mode.

The present invention provides an improved fiber optic subscriber loop architecture which reduces the overall cost of the system and prevents theft of services. Such a system selectively transmits only information ordered by the subscriber to the subscriber premises and, thus, eliminates the need for scramblers (at the central office or network node) and descramblers (at the subscriber premises). This results in a reduction in equipment and cost of the overall system. Such an arrangement also prevents unauthorized use or access (i.e., theft) of information services by a subscriber premises.

Other and further objects, advantages and features of the present invention will be understood by reference to the following specification in conjunction with the annexed drawings, wherein like parts have been given like numbers.

DESCRIPTION OF THE PREFERRED EMBODIMENTS

1. Switching of Optical Signals

Figure 1:
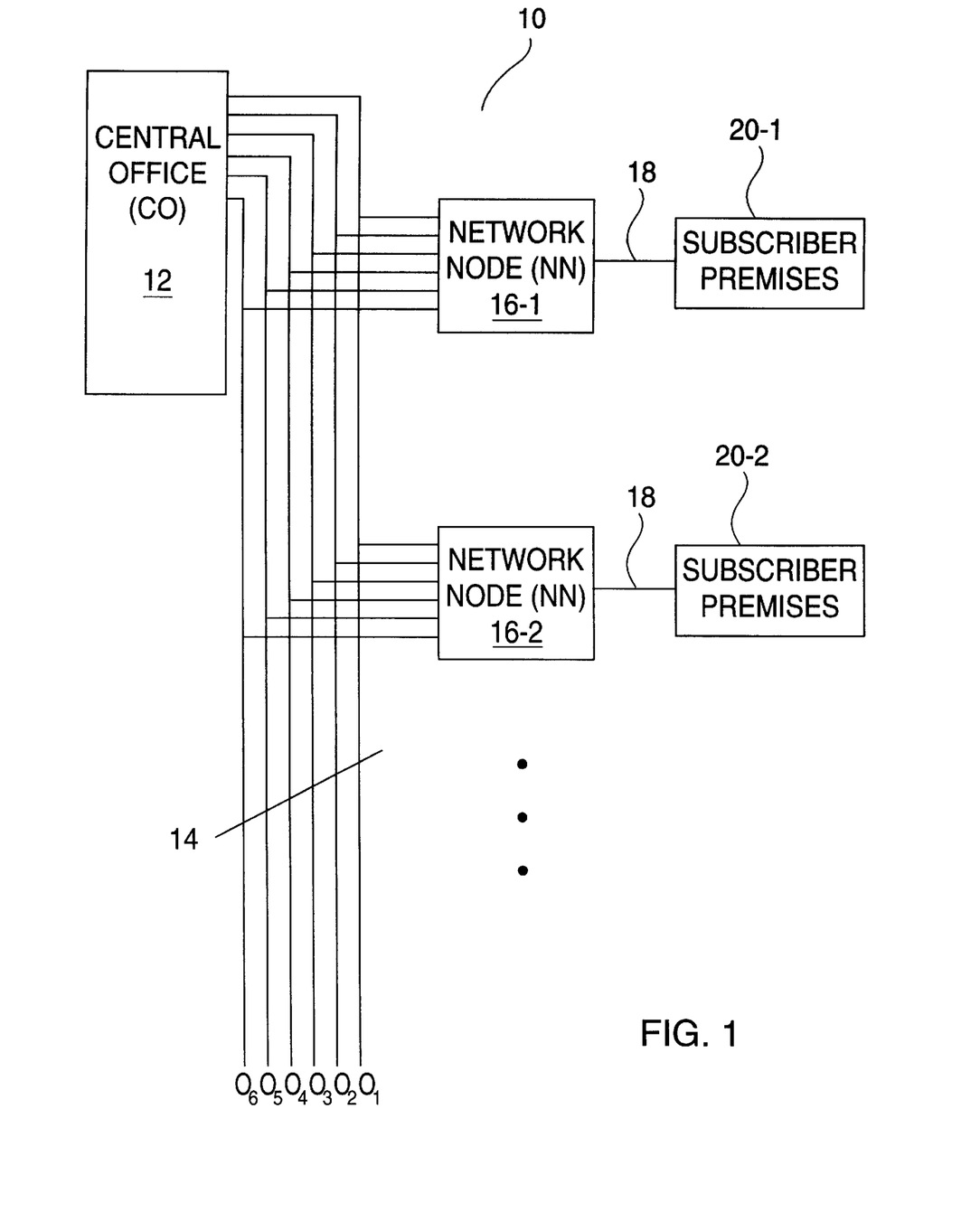
FIG. 1 is a block diagram of a fiber optic subscriber loop system with a central office that cooperates with a plurality of network nodes to provide selected information services to a plurality of subscriber premises.

FIG. 1 is a block diagram of an information distribution system 10 in accordance with one aspect of the present invention. Information distribution system 10 includes a central office 12 which is connected by fiber optic feeder cable 14 to a plurality of network nodes (NN) 16-1, 16-2,... etc. Each network node 16-1, 16-2 is connected by a fiber optic line 18 to a corresponding subscriber premises 20-1, 20-2. As shown in FIG. 1, each network node 16-1, 16-2 is positioned exterior to a corresponding subscriber premises 20-1, 20-2.

At central office 12, a full band of downstream information, comprising six optical bands 01 through 06, is transmitted to each network node 16-1, 16-2 via fiber optic cables 14. Each network node 16-1, 16-2 selects a subset of bands 01 through 06 entitled by its respective subscriber premises 20-1, 20-2 (i.e., selects only those channels ordered by the subscriber). Such selected bands are then combined and transmitted to the corresponding subscriber premises 20-1, 20-2, across a single fiber optic line 18.

Figure 2:
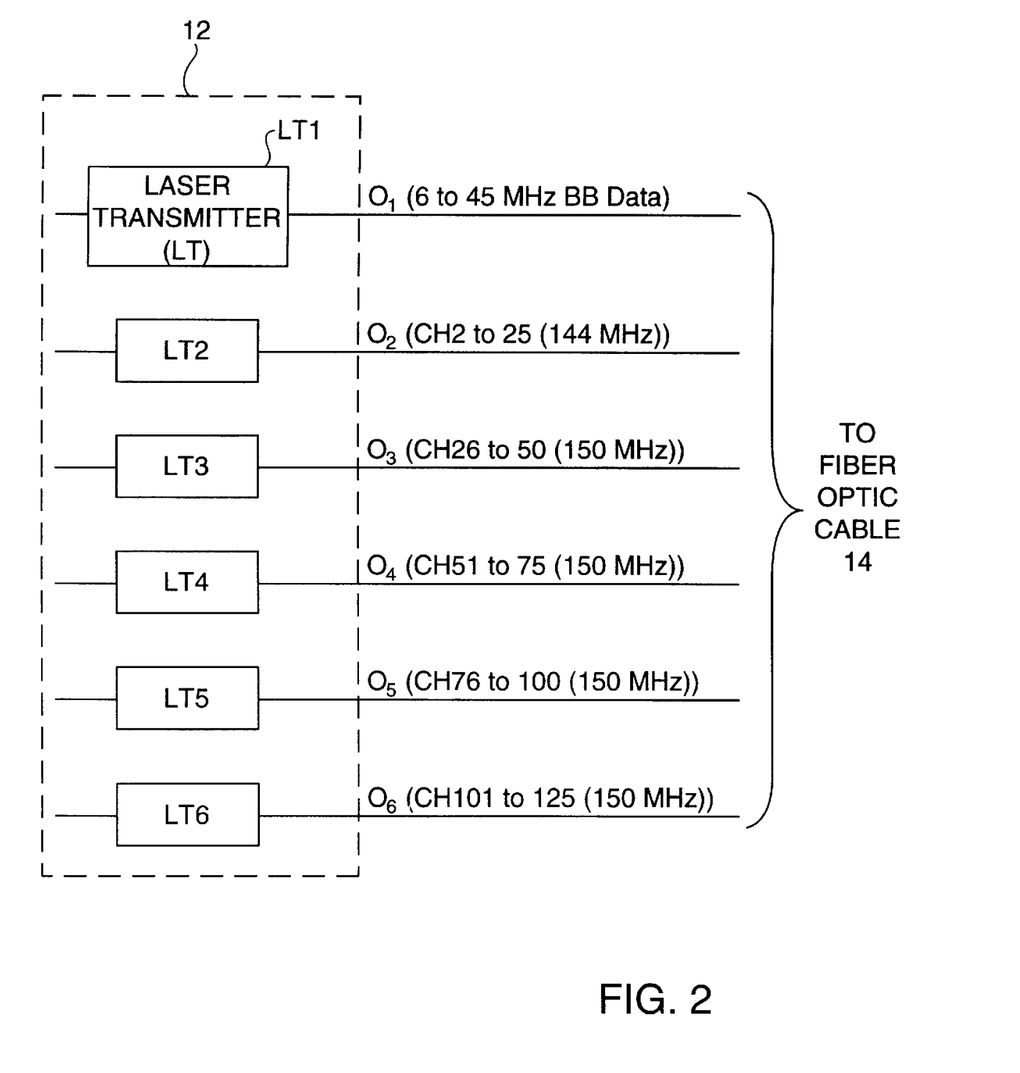
FIG. 2 is a block diagram of a central station which implements the invention hereof.

FIG. 2 shows a block diagram of central office 12 where electrical signals are converted to optical signals using laser transmitters, i.e., laser diodes, for light sources in the central to remote direction. Laser transmitters offer the linear performance characteristic required for the transmission of analog color signals and a higher frequency response than alternative LED light sources. Each laser transmitter generates a carrier wavelength corresponding to a different color. Signals are then modulated onto different carrier wavelengths for downstream transmission. Such modulation methods are commonly understood in the art and will not be discussed in further detail herein.

In the preferred embodiment of information distribution system 10, central station 12 employs a full band from 5 MHz to 1000 MHz, which is divided into six optical bands 01 through 06, for transmitting downstream information to each network node 16 (FIG. 1). The electrical signals from each band are converted into optical signals, 01 through 06, by modulating six laser transmitters LT1 through LT6 at different wavelengths corresponding to different colors. After downstream information is modulated onto optical bands 01 through 06, the optical bands are then transmitted to each network node 16 (FIG. 1), via optic feeder cables 14.

The nature and purpose of each optical band, 01 through 06, is described herein (FIG. 2). Specifically, optical band 01 comprises the frequency domain of 5 MHz to 35-to-45 MHz and is preferably utilized for bi-directional data communication between central office 12 and premises 20. Optical bands 02 through 06 carry audio/video information for use by a television receiver, located at subscriber premises 20. Optical band 02, having a bandwidth of 144 MHz carries information corresponding to channels 2 though 25; optical band 03, having a bandwidth of 150 MHz, carries downstream information corresponding channels 26 to 50; optical band 04, having a bandwidth of 150 MHz, carries downstream information corresponding channels 51 through 75; optical band 05, having a bandwidth of 150 MHz, carries downstream information corresponding to channels 76 to 100; and optical band 06, having a bandwidth of 150 MHz, carries downstream information corresponding to channels 101 to 125. Although information distribution system 10 utilizes six optical bands for transmitting downstream information, any number of optical bands or any bandwidth may be utilized as desired. For instance, eight, sixteen and thirty-two optical bands are typically employed in the industry for downstream transmission.

Figure 3:
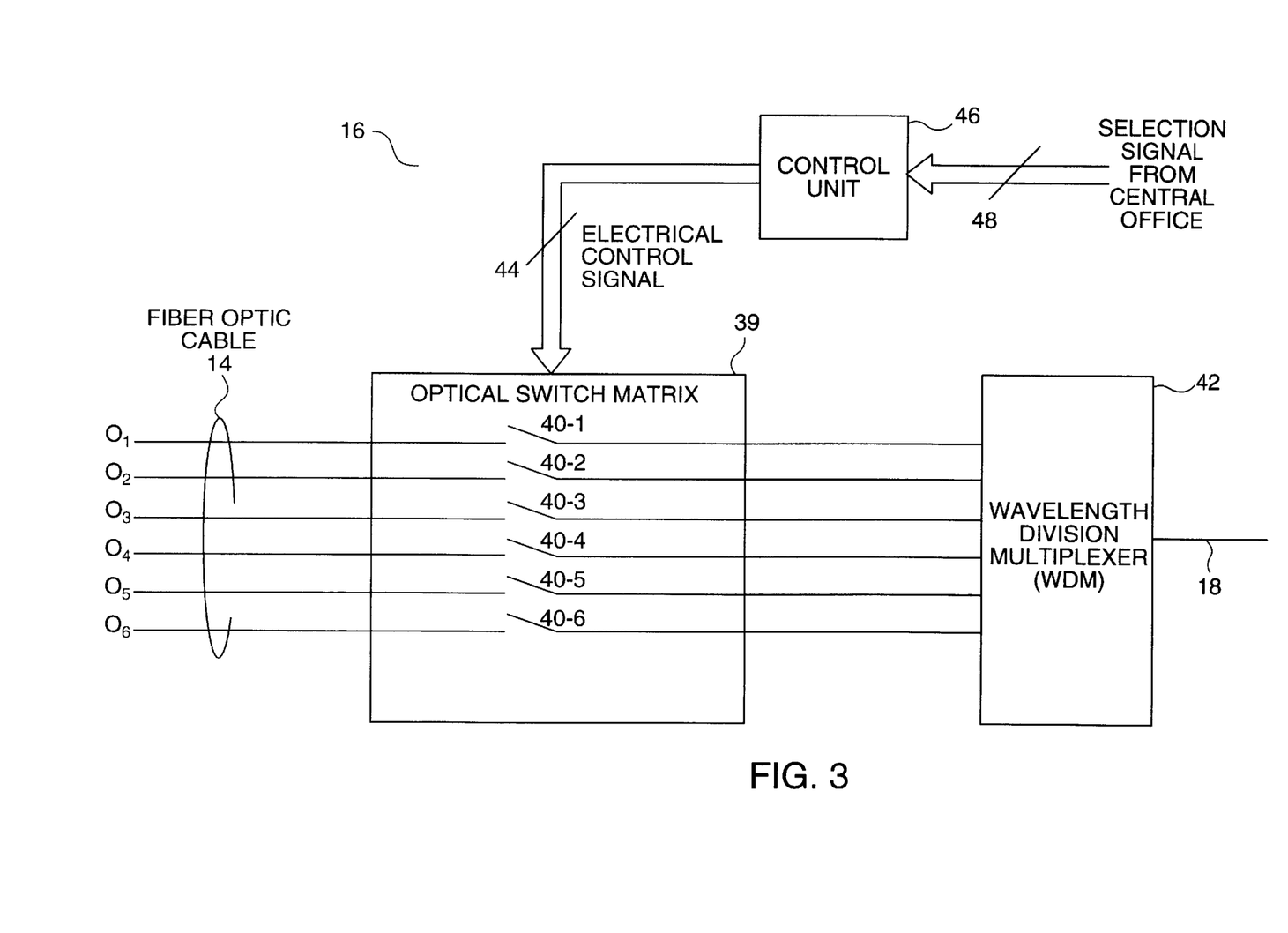
FIG. 3 is a block diagram of a network node which implements the invention hereof.

FIG. 3 illustrates a network node 16 which includes an optical switch matrix 39 having optical switches 40-1 through 40-6 corresponding to optical bands 01 through 06. Optical bands 01 through 06 are received by network node 16, via optical cable feeder 14, and are respectively coupled to optical switches 40-1 through 40-6. Optical switches 40-1 through 40-6 can be controlled by electrical control signals to select or deselect any optical band 01 through 06 (via optical switches 40-1 through 40-6) destined for subscriber premises 20.

Optical switches 40-1 through 40-6 can be controlled from a remote location, i.e., central office 12, or preprogrammed to select or de-select any optical band 01 through 06 destined for subscriber premises 20. Such an arrangement can be accomplished in the following manner. Each network node 16 may include a microprocessor-based control unit 46 which is either pre-programmed with the subscriber's order or receives selection signals 48 (i.e., codes) from central office 12. Selection signals 48 may be received via telephone line, Radio Frequency (RF) or optic fiber cables 14. Upon receipt of selection signals 48, control unit 46, utilizing a digital-to-voltage (D/V) converter, generates electrical switch control signals 44 in accord with selection signals 48. Optical switch matrix 39 receives electrical control signals 44 and initiates the completion of the requested optical path connection, thus allowing only those optical bands ordered by subscriber premises 20 to be transmitted to subscriber premises 20.

Network node 16 further includes a wavelength division multiplexer (WDM) 42 which receives the selected optical bands (i.e., a subset of 01 through 06) from optical switch matrix 39. WDM 42 combines the selected optical bands into a single optical signal which is then transmitted across fiber optic line 18 to respective subscriber premises 20.

It is important to understand that network node 16 is positioned exterior to subscriber premises 20 (and not at subscriber premises 20) to prevent theft of services at subscriber premises 20. Network node 16 can be either mounted and installed at central office 12 or on a pole, vault or in a node configuration near subscriber premises 20. As can be appreciated by those skilled in the art, the switching function provided by network node 20 allows central office 12 to maintain control over downstream information (i.e., 01 through 06) by transmitting only those bands ordered by subscriber premises 20 to subscriber premises 20. Network node 16 eliminates the need for scramblers and descramblers at central office 12 and subscriber premises 20 and, thus, reduces the overall cost of the system. Such a system also prevents subscriber premises 20 from utilizing a black market set top box (i.e., an intelligent set top with descrambling capabilities) to steal information services.

Figure 4:
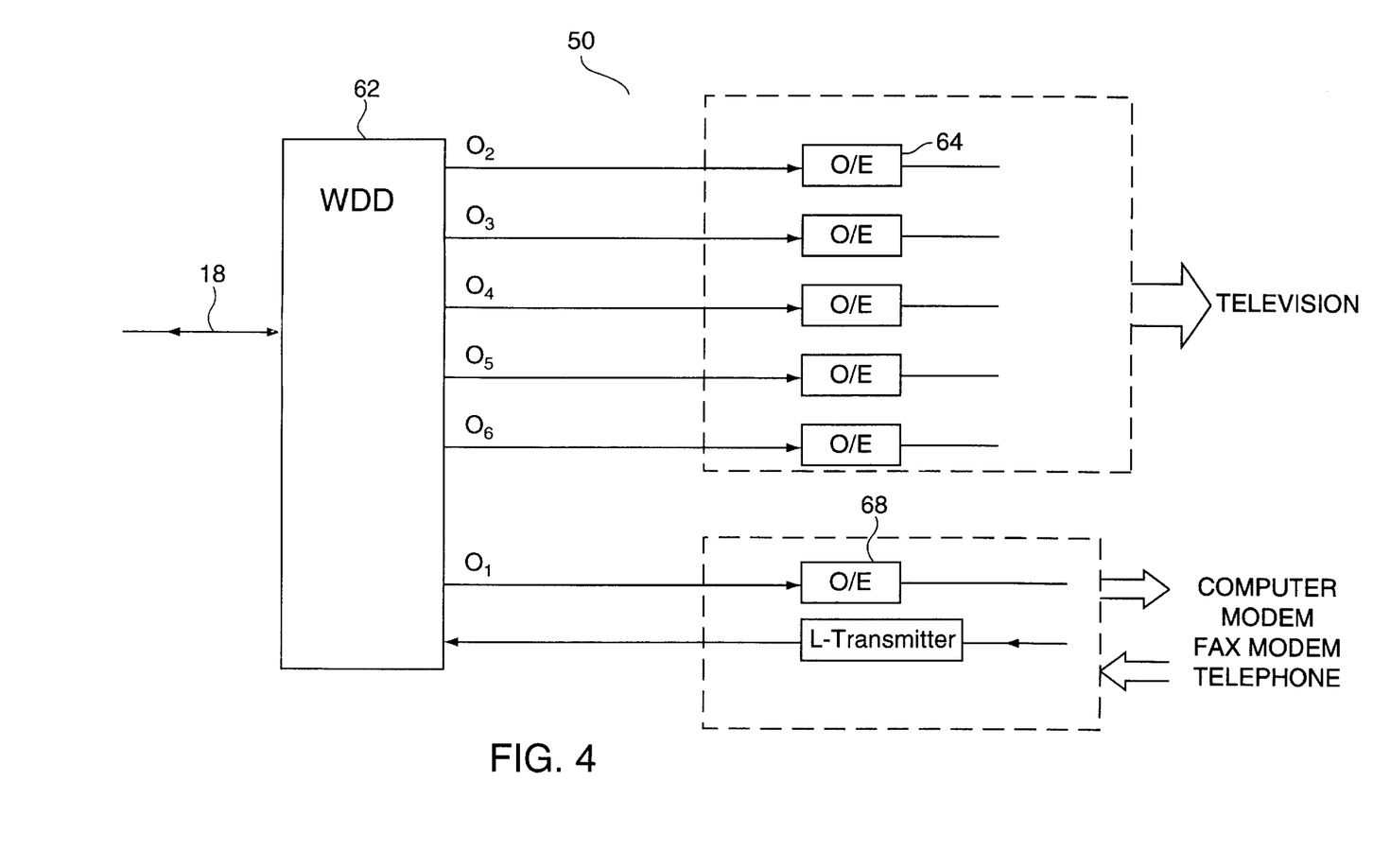
FIG. 4 is a block diagram of a subscriber premises which implements the invention hereof.

As illustrated in FIG. 4, subscriber premises 20 has a set top box 50 which receives the single optical signal (i.e., selected downstream information) from respective network node 16, via fiber optic line 18. Set top box 50 includes a Wavelength Division Demultiplexer (WDD) 62 and a plurality of low bandwidth Optical/Electrical (O/E) converters.

WDD 62, coupled to fiber optic line 18, is utilized to separate optical bands 02 through 06. WDD 62 receives the single optical signal and separates it back into the selected optical bands, in particular, a subset of optical bands 02 through 06. Each selected optical band is then converted into RF, by a corresponding low bandwidth O/E converter 64.

WDD 62 is also utilized to separate optical band 01 (i.e., 5 to 35-to-45 MHz BB data) from the single optical signal. As previously mentioned, optical band 01 is preferably utilized for both upstream and downstream data transmission between central office 12 and subscriber premises 20. Such an arrangement can be accomplished by having optical band 01 include both modulated and unmodulated wavelengths. The modulated wavelengths carry downstream information from central office 12 to subscriber premises 20; and the unmodulated wavelengths are utilized at subscriber 20 to transmit upstream information to central office 12. Subscriber premises 20 includes a laser transmitter 70 for modulating upstream information onto unmodulated wavelengths of optical band O1. Such a two-way data link can be utilized by a computer, fax machine, telephone, modem at subscriber 20.

It should be understood that, at subscriber premises 20, set top box 50 does not operate over the entire band, i.e., the single optical signal. That is to say, set top box 50 does not convert the entire single optical signal into RF. Instead, the single optical signals are separated by WDD 62, and low bandwidth O/E converters 64, 68 are then employed to convert the selected bands into RF. Such an implementation reduces the overall cost of set top box 50 by eliminating the need to operate over the entire band at the same time. More importantly, such an arrangement allows information distribution system 10 to meet the required dynamic range and linearity specifications.

Instead of having a set top box for each television set at subscriber premises 20, set top box 50 can also be configured in the basement (or any other convenient location) of subscriber premises 20 to convert all delivered bands at once. The converted bands (i.e., channels) can then be transmitted to each television set in the clear, over cables. Such an arrangement eliminates the need for multiple set top boxes for those subscriber premises having more than one television set and, thus, may decrease the overall cost of the equipment at those subscriber premises.

2. Switching of Electrical Signals

The origin of the optical signals O1–O6 in the description of the illustrative embodiment covered by FIGS. 1–4 was not presented in great detail except for the description with respect to FIG. 2, which indicated that electrical signals serve as inputs to a bank of lasers (LT1–LT6) and the electrical signals are converted to optical signals O1–O6 using the laser bank.

Thus, whereas the foregoing description concentrated on the optical switching of optical signals O1–O6 destined for each subscriber with a primary goal of preventing fraud, the illustrative embodiment of this section: (a) effects electrical switching of the original electrical signals which had impliedly been processed to produce optical signals O1–O6; and (b) is configured so that sensitive components are located only in controlled environments, namely, the central office and the subscriber premises. Again, the goal of preventing fraud is realized.

However, the instant illustrative embodiment depicts a communication system arranged such that: (a) a dedicated fiber per subscriber is utilized, that is, each subscriber is connected to the central office with their own fiber optic cable so as to implement a "star" distribution network (in contrast to a "tree-and-branch" distribution); (b) a pair of low-power lasers is deployed per subscriber in a duplex communication mode—one laser is located in the central office for downstream transmission, and another laser is located at the subscriber premises for upstream propagation; and (c) both broadband and narrowband signals are propagated in the downstream direction at a first light wavelength or color, and only narrowband signals are propagated in the upstream direction at a second light wavelength or color—accordingly, the downstream and upstream communications are separated by the wavelength of light, in contrast to the other heretofore known systems whereby bi-directional, narrowband communication is effected over only one of the light wavelengths.

2.1 Central Office Location 110

Figure 5:
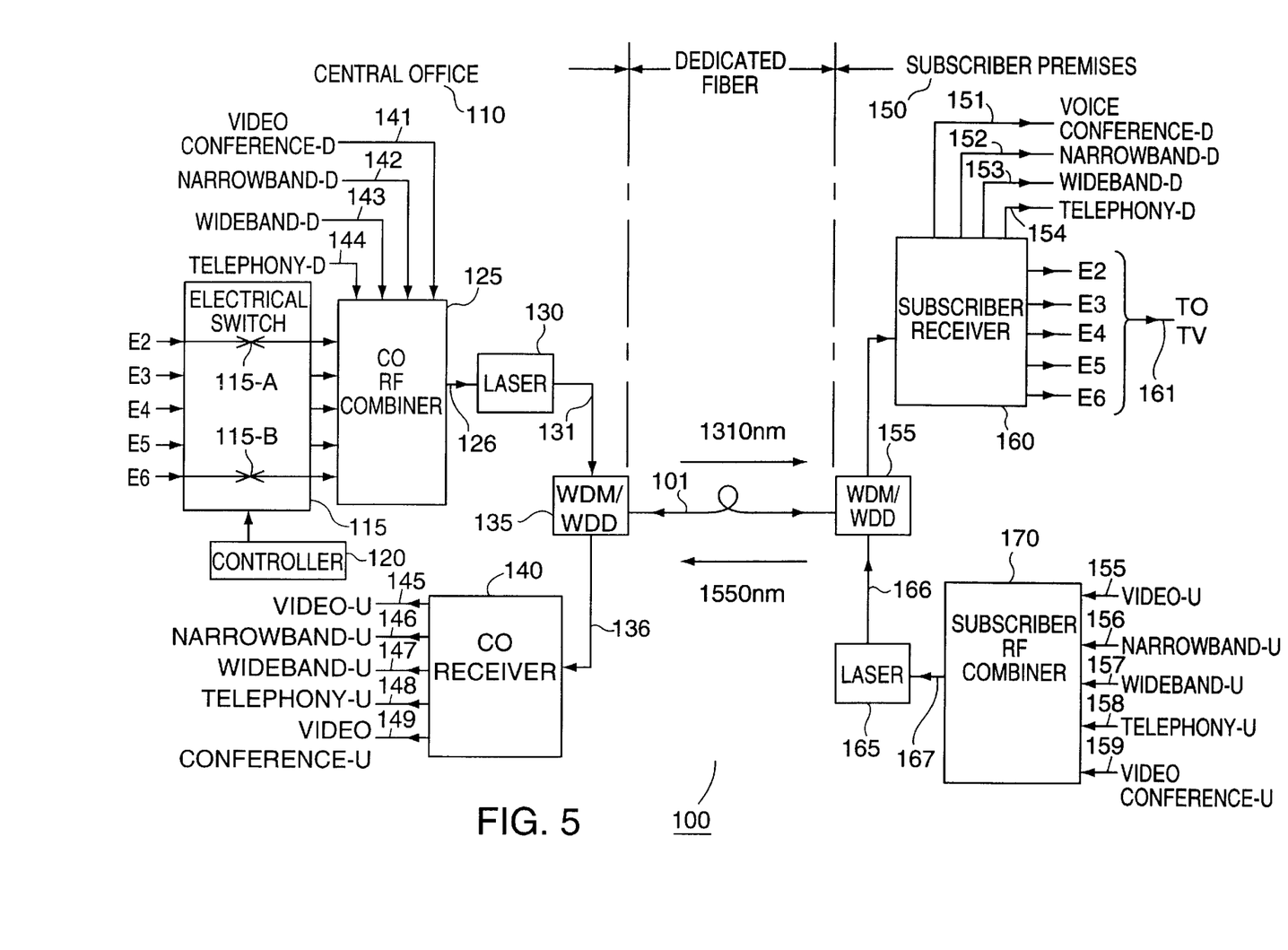
FIG. 5 is a high-level block diagram of an illustrative system for an individual subscriber wherein electrical signals are switched and then processed to compose the optically transmitted signals.

With reference to FIG. 5, system 100 in accordance with one illustrative embodiment of the present invention is shown in high-level block diagram form for a single subscriber. The elements of system 100 located in central office (CO) 110 include: (a) electrical switch 115 having electrical signals E2–E6 as inputs; (b) CO radio frequency (RF) combiner 125 having inputs from switch 115 as well as four other exemplary electrical signal inputs referred to as 'video-D', 'narrowband-D', 'wideband-D', and 'telephony-D' (the 'D' designating transmission downstream); (c) laser 130 coupled to combiner 125; (d) passive wave division multiplexer/wave division demultiplexer (WDM/WDD) 135 coupled to laser 130 as one input, and to dedicated fiber 101 as both an input and output; and (e) CO receiver 140 coupled to WDM/WDD 135–receiver 140 has five exemplary outputs referred to as 'video-U', 'narrowband-U', 'wideband-U', 'telephony-U', and 'video conference-U' (the 'U' designating transmission upstream).

The electrical signals E2–E6 are, without loss of generality, those signals giving rise to optical signals O2–O6 discussed in the previous Section 1. From the previous section, the optical signals O1–O6 occupy a frequency band preferably from 5 MHz to 1000 MHz. For example, O2 conveys a 144 MHz frequency band corresponding to analog video channels 2 through 25; thereafter, each of the other bands O3–O6 occupies a 150 MHz band and conveys corresponding channels in blocks of 25. Finally, the optical signal O1 is used for the downstream component of bi-directional data and occupies the frequency band from 5 to 35-to-45 MHz. A summary of the frequency allocations for optical signals O1–O6 is shown in FIG. 6 for the downstream direction.

In general, each optical signal O1–O2 is derived from a corresponding set of electrical signals. For example, O2 is generated from an originating set of electrical signals referred to as E2, and the corresponding electrical signals composing E2 are twenty-four multiplexed signals for channel 2, channel 3, . . . , channel 25 where each channel occupies a 6 MHz band; similar originating electrical signals E3–E6 correspond to optical signals O3–O6. Electrical switch 115 is interposed for the purpose of delivering to combiner 125 only those channels subscribed to/desired by the particular downstream subscriber located at subscriber premises 150. For instance, if the customer at premises 150 only subscribes to the optical signals comprising O2 and O6, then switch 115 is closed to connect only E2 and E6 to combiner 125 (shown by closure points 115-A and 115-B of switch 115). Control of switch 115 is effected by controller 120, that is, as was discussed with respect to FIG. 3, selection signals are provided by CO 110 to controller 120 based upon the latest choice of service by the subscriber.

To reiterate, optical channel signal O1 typically is composed of the frequency band from 5 MHz up to 35-to-45 MHz, and is preferably used for the downstream component of bi-directional communications—such as video conferencing, wideband data (e.g., 10 Mbs), narrowband data (e.g., ISDN and ADSL), and multi-channel telephony. In system 100, the electrical signals used to generate O1 have now been shown separately as the electrical signals 'video conference-D', 'narrowband-D', 'wideband-D', and 'telephony-D' appearing on paths 141–144, respectively. Whereas E2–E6 are one-way signals intended for a wide distribution to numerous subscribers, the downstream electrical signals on paths 141–144 generally, when paired with the upstream signals shown on paths 146–148 in FIG. 5, are bi-directional as well as subscriber-dependent, that is, these electrical signals are associated with a particular subscriber, so these signals are not switched by a switch as are signals E2–E6 by switch 115.

Figure 6:
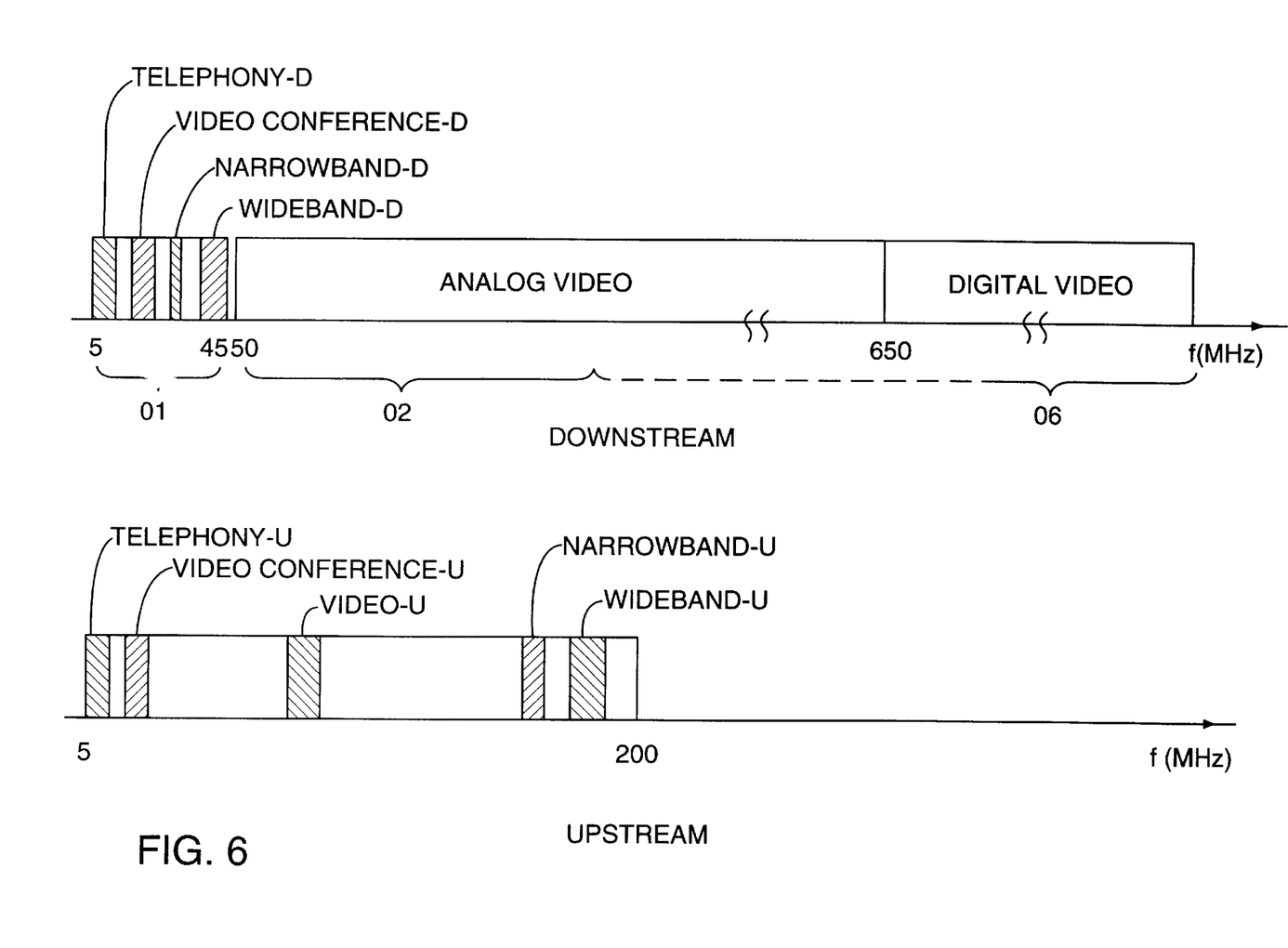
FIG. 6 depicts the frequency domain assignments for the downstream and upstream electrical signals.

RF combiner 125 functions as a frequency-division combiner which sums the modulated components of the various electrical signals into pre-defined frequency bands shown in FIG. 6. For instance, E3, composed of analog video channels 26 to 50 having a total bandwidth 150 MHz, is modulated to occupy a band of frequencies from 194 to 344 MHz. As another example, E6, composed of digital video channels occupying a total bandwidth of 150 MHz, is modulated to the high end of the overall bandwidth, that is, between 850 to 1000 MHz. On the other hand, for instance, 'telephony-D' may be composed of 6 telephone-like analog, vestigial sideband (VSB) modulated signals each having a 1 MHz bandwidth located, say, between 20–26 MHz by the summing functionality of combiner 125. Combiner 125 delivers a single modulated electrical output signal, composed of frequency-shifted baseband signals shown in the top-half of FIG. 6, on path 126 to laser 130. In turn, the single electrical signal on path 126 is used to modulate the optical output of laser 130, having an optical wavelength nominally 1310 nm for the preferred embodiment, to thereby generate a modulated optical output signal on path 131 emanating from laser 130. The modulated optical output signal on path 131 is delivered to WDM/WDD 135 for propagation over fiber 101 to subscriber premises 150.

It can also be readily contemplated that it is possible to further subdivide the electrical composite signals E2–E6 into their constituent parts, so that if E2 is composed of electrical signals denoted E2(1), E2(2), . . . , E2(24) corresponding to 24 analog video channels, then each E2(i), i=1, 2, . . . , 24, could serve as an input to switch 115. Each E2(i) is a baseband signal, and combiner 125 positions each E2(i) to its assigned location in the RF bandwidth between 5 and 1000 MHz. Of course, switch 115 requires as many switching cross-points as there are individual electrical input signals in this realization; this is in contrast to the implementation shown in FIG. 5 wherein switch 115 requires only five cross-points.

2.2 Subscriber Premises 150

Again with reference to FIG. 5, the subscriber portion of system 100 located at subscriber premises 150, which could be implemented in a set-top box, includes: (a) passive WDM/WDD 155 which is coupled to dedicated optical fiber 101; (b) subscriber receiver 160 coupled to WDM/WDD 155; (c) subscriber RF combiner 170; and (d) transmitter laser 165 coupled to combiner 170 at its input and to WDM/WDD 155 as its output. Receiver 160 outputs the full video band containing E2–E6 originating at central office 110 on path 161 to a TV detector (not shown) of the subscriber's TV which detects the selected channels. Path 161 propagates E2–E6 as electrical signals located at juxtaposed frequency bands in the frequency domain as per the top-half of FIG. 6.

In addition, receiver 160 detects the signals used for bi-directional communication, namely, the counterparts to the signals appearing on paths 141–144 at CO 110; the counterparts are designated, as before, 'video-D', 'narrowband-D', wideband-D', and 'telephony-D' and appear on output paths 151–154, respectively. To recover the baseband version of these signals, receiver 150 includes a demodulator (discussed later) which converts the modulated signals (as produced by combiner 125 at CO 110) to baseband using standard demodulation techniques that are well-known in the art.

Five electrical signals for upstream communication, namely, 'video-U', 'narrowband-U', 'wideband-U', 'telephony-U', and 'video conference-U', appearing on paths 155–159, serve as inputs to subscriber RF combiner 170. The signals on paths 145–149 in CO 110 are the received counterparts of the signals originating on paths 155–159. The signals on paths 146–149 are the upstream components of the bi-directional communications effected by system 100, whereas the transmitted signal on path 155 and the received signal on corresponding path 145 conveyed only an upstream channel, such as 'Video-U' shown in FIG. 5. RF combiner 170 outputs a single electrical signal on path 167 to laser 165. The signal on path 166 serves as a modulation signal which modulates the intensity of laser 165 at the second, upstream light wavelength of, preferably, 1550 nm. The output of laser 165, on optical path 166, serves as an input to WDM/WDD 155, which signal is, in turn, propagated over fiber 101. The frequency allocations for the bi-directional communication aspect of system 100 are also shown in bottom-half of FIG. 6 for the upstream direction; the upstream signals preferably occupy a band from 5 to about 200 MHz.

2.3 Central Office Arrangement to Serve a Plurality of Subscribers

Figure 7:
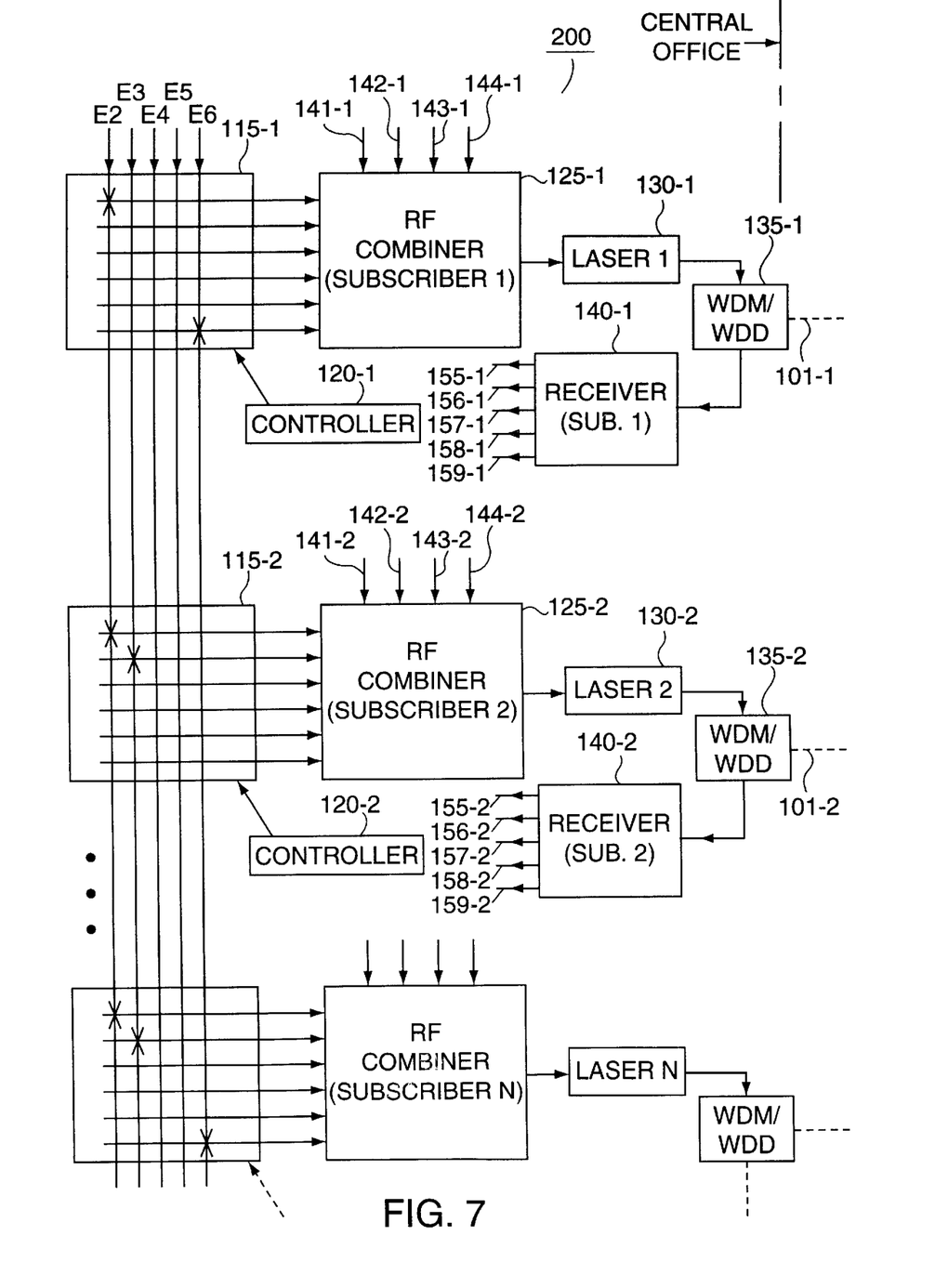
FIG. 7 is a high-level block diagram of an illustrative system for a plurality of subscribers each having the central office portion of the arrangement depicted in FIG. 5.

Turning now to FIG. 7, there is shown illustrative front-end arrangement 200 located in the central office for serving a plurality of customers each arranged according to the central office portion of system 100 of FIG. 5. For instance, subscriber 1 is served by switching matrix 115-1, RF combiner 125-1, laser 130-1, WDM/WDD 135-1, receiver 140-1, controller 120-1, and fiber 101-1, which are the counterparts, respectively, of matrix 115, combiner 125, laser 130, WDM/WDD 135, receiver 140, controller 120, and fiber 101 of FIG. 5. Similarly, subscriber 2 is served by switching matrix 115-2, RF combiner 125-2, laser 130-2, WDM/WDD 135-2, receiver 140-2, controller 120-2, and fiber 101-2. In the realization of FIG. 7, the electrical signals E2-E6 are provided as inputs to every switching matrix 115-1, 115-2, . . . since E2–E6 must be accessible to every subscriber to satisfy service preferences.

Electrical signals on paths 141-1 through 144-1 are the counterparts to signals on paths 141 through 144 of FIG. 5, and similarly for the electrical signals on paths 141-2 through 144-2. The electrical signals on paths 141-1 through 144-1 are specific to subscriber 1, as the electrical signals on paths 141-2 through 144-2 are specific to subscriber 2, so the subscriber-specific signals need not be passed through a switch array.

For completeness, the upstream electrical signals on paths 155-1 through 159-1 for subscriber 1 are the electrical counterparts to the signals on paths 155–159 of FIG. 5, as are paths 155-2 through 159-2 for subscriber 2.

Finally, each subscriber of FIG. 7 (i.e., subscriber 1, subscriber 2, . . . , subscriber N) is served at their premises by that portion of system 100 shown on subscriber premises 150 of FIG. 5.

2.4 Illustrative Embodiment of Subscriber and CO Receivers

Figure 8:
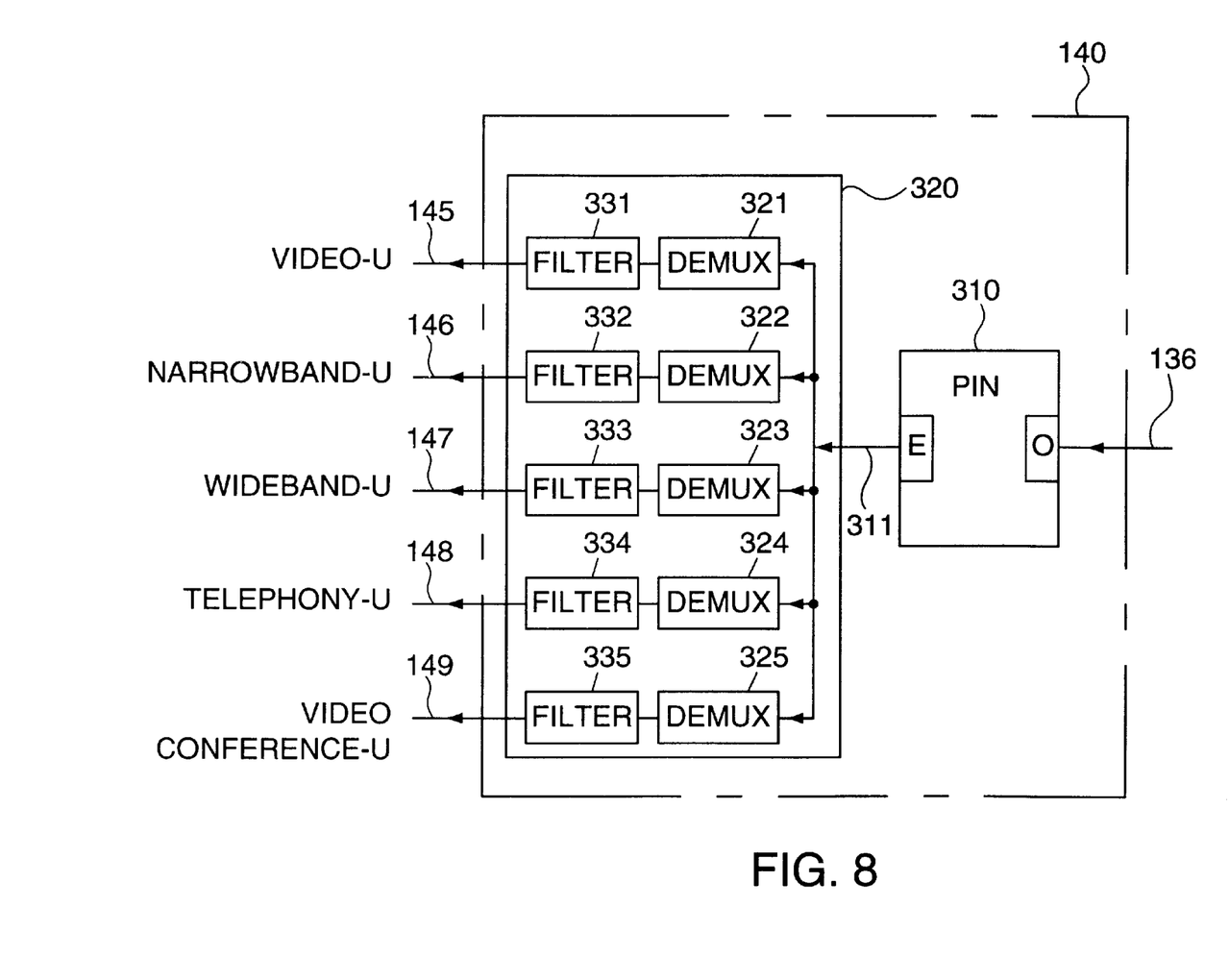
FIG. 8 is a block diagram of the central office receiver portion of the system shown in FIG. 5.

Referring now to FIG. 8, there is shown a block diagram for central office receiver 140 of FIG. 5. In particular, receiver 140 is composed of: (a) PIN diode detector 310 coupled to WDM/WDD 135 via optical path 136 at port O and providing a multiplexed electrical output signal from port E to path 311, the multiplexed signal including the upstream communications signals 'video-U', . . . , 'videoconference-U' appearing on paths 155–159 of FIG. 5; and (b) electrical demultiplexer 320 for converting the multiplexed signal on path 311 to individual baseband signals corresponding to 'video-U', . . . , 'video conference-U', respectively. Demultiplexer 320 is, illustratively, composed of a bank of demultiplexers (demux) 321–325, and a bank of filters 331–335 such that: demux 321 and filter 331 form a cascade pair; demux 322 and filter 332 form another cascade pair; and so forth. The function of each demux-filter pair is to frequency shift each passband signal to baseband. Of particular interest is the operation of demux 324/filter 334 pair since it is desirable to have a plurality of telephony paths, typically six independent paths, provided by system 100. If the signal on each telephony path is analog, then demux 324 is, itself, a bank of six demuxes wherein each demux in the bank demodulates the corresponding analog signal to baseband. To minimize the bandwidth of the analog signal, it may be preferable to transceiver each telephony signal as an analog vestigial sideband (VSB) signal, so each demux converts a VSB signal to baseband. In this case, path 148 provides six parallel outputs, each corresponding to a baseband telephony signal. If the signal on each telephony path is digital, then it is necessary to interpose a D/A converter between path 311 and demux 324.

Subscriber receiver 160 is arranged in essentially the same manner as central office receiver 140 in that receiver 160 is composed of a PIN diode detector to convert the optical input signal from WDM/WDD 155 to an electrical signal, which signal in turn serves as the input to a bank of demux-filter pairs to thereby restore the downstream communication signals 'video conference D', . . . , 'telephony-D' to baseband.

2.5 Components of the Preferred Embodiment of System 100

In a preferred embodiment of system 100, laser 130 is a distributed feedback (DFB) laser, such as the A371 series laser module manufactured by Lucent Technologies; laser 130 operates at a low-power (e.g., about 2 mw) and exhibits a linearity characteristic suitable for propagating optical'signals over the bandwidth from 5–1000 MHz. Laser 165 may be of the same type as laser 130, although the requirements on laser 165 are not as rigorous as those of laser 130 because laser 165 operates over a narrower bandwidth. WDD/WDM 135 and 155 are available as standard optical components. Each crosspoint of switch 115 may be realized by a micro-electromechanical switch (MEMS) such as available from the Rockwell Corporation. RF combiners 125 and 170 are conventional components available from Jerrold Electronics.

3.0 Relation Between Optical and Electrical Switching Aspects of the Embodiments As stated in Section 1.0, optical band O1 is preferably utilized for bi-directional data communication between the central office and the subscriber premises. With reference to this operational mode, it was further stated in Section 1.0 that the subscriber premises includes a laser transmitter for modulating upstream information onto unmodulated wavelengths of optical band O1, and that the two-way data link can be utilized by a computer, fax machine, telephone, or modem.

Section 2.0 sets forth in detail, particularly with respect to FIG. 5, how bi-directional communication can readily be effected using one optical wavelength for downstream propagation of 'telephony-D', 'narrowband-D', . . . , and another optical wavelength for upstream propagation of 'telephony-U', narrowband-U', . . . , which are the counterparts to the former signals. It is readily apparent to one of ordinary skill in the art that the more detailed description with respect to FIG. 5 is equally applicable to the description of FIG. 4 wherein the bi-directional aspect of the optical switching aspect of the present invention was also described for the optical switching embodiment.

The invention having thus described with particular reference to the preferred forms thereof, it will be obvious that various changes and modifications may be made therein without departing from the spirit and scope of the invention as defined in the appended claims.

What is claimed is:

1. A system for communicating a subset of electrical signals downstream between a central location and a customer's premises, the central location and the customer's premises being interconnected by a dedicated optical fiber, the system comprising an electrical switch, at the central location, for receiving the electrical signals at an input of the switch and for delivering the subset of the electrical signals at an output of the switch, the electrical switch operable to provide only the subset of the electrical signals at its output as subscribed to by the customer, a downstream electrical-optical converter, coupled to the switch at the central location, for converting the subset of electrical signals onto a single downstream optical signal propagated over the optical fiber at a first optical wavelength, and a downstream optical-electrical converter, coupled to the optical fiber at the customer's premises, for detecting the downstream optical signal and for converting the detected downstream optical signal into electrical received versions of the subset of electrical signals for use by the customer.

2. The system as recited in claim 1 to further transmit second electrical signals between the central location and the customer's premises, the downstream electrical-optical converter being adapted for receiving the second electrical signals at its input and for changing the downstream optical signal in correspondence to the second electrical signals, and the downstream optical-electrical converter being adapted for converting the detected downstream optical signal into second electrical received versions of the second electrical signals for use by the customer.

3. The system as recited in claim 2 further including an upstream electrical-optical converter, at the customer's premises, for converting third electrical signals into an upstream optical signal, and for transmitting the upstream optical signal over the optical fiber at a second optical wavelength, and wherein the central location further includes an upstream optical-electrical converter for detecting the upstream optical signal and for converting the upstream optical signal to detected electrical versions of the third electrical signals.

4. The system as recited in claim 3 wherein the downstream electrical-optical converter includes a downstream radio-frequency (RF) combiner for receiving the subset of modulated electrical signals and the second electrical signals and for combining each of the modulated electrical signals in the subset and each of the second electrical signals to a pre-determined frequency band to produce a single downstream electrical signal, and a downstream laser operating at the first wavelength, coupled to the downstream RF combiner, for generating the downstream optical signal from the single downstream electrical signal.

5. The system as recited in claim 4 wherein the downstream electrical-optical converter includes a downstream wave division multiplexer, coupled to the downstream laser and the optical fiber, for multiplexing the downstream optical signal onto the optical fiber.

6. The system as recited in claim 5 wherein the upstream electrical-optical converter includes
- an upstream radio-frequency (RF) combiner for receiving the third electrical signals and for modulating each of the third electrical signals to a pre-determined frequency band to produce a single upstream electrical signal, and
- an upstream laser operating at the second wavelength, coupled to the upstream RF combiner, for generating the upstream optical signal from the single upstream electrical signal.

7. The system as recited in claim 6 wherein the upstream electrical-optical converter includes an upstream wave division multiplexer, coupled to the upstream laser and the optical fiber, for multiplexing the upstream optical signal onto the optical fiber.

8. The system as recited in claim 7 wherein the upstream wave division multiplexer is further arranged as a wave division demultiplexer for delivering the downstream optical signal to the downstream optical-electrical converter.

9. The system as recited in claim 7 wherein the downstream wave division multiplexer is further arranged as a wave division demultiplexer for delivering the upstream optical signal to the upstream optical-electrical converter.

10. The system as recited in claim 7 wherein the downstream optical-electrical converter includes a photodetector.

11. The system as recited in claim 7 wherein the upstream optical-electrical converter includes a photodetector.

12. A system for communicating a subset of first electrical signals and second electrical signals downstream and third electrical signals upstream between a central location and a customer's premises, the third electrical signals including the upstream counterparts to the second electrical signals, the central location and the customer premises being interconnected by a dedicated optical fiber, the system comprising
- an electrical switch, at the central location, for receiving the first electrical signals at its input and for delivering the subset of first electrical signals in parallel at its output,
- a first radio frequency combiner for converting the parallel subset of the first electrical signals and the second electrical signals originating at the central location into a single downstream electrical signal,
- a first laser for converting the downstream electrical signal to a first modulated optical signal at a first wavelength,
- a first wave division multiplexer/demultiplexer for coupling the first optical signal to the optical fiber,
- a second wave division multiplexer/demultiplexer, coupled to the optical fiber at the customer's premises, for detecting the first optical signal,
- a customer receiver, coupled to the second multiplexer/demultiplexer, for converting the first optical signal into detected versions of the subset of first electrical signals and downstream versions of the second electrical signals,
- a second radio frequency combiner for converting the third electrical signals for upstream transmission into a single electrical upstream signal,
- a second laser for converting the upstream electrical signal to a second modulated optical signal at a second wavelength, the second optical signal serving as an input to second multiplexer/demultiplexer, and
- a central location receiver, coupled to the first multiplexer/demultiplexer, for converting the second optical signal into upstream versions of the third electrical signals.

13. A transmitter for communicating a subset of electrical signals downstream from a central office to a customer's premises, the central office and the customer's premises being interconnected by a dedicated optical fiber, the transmitter comprising
- an electrical switch, at the central office, for receiving the electrical signals at an input of the switch and for delivering the subset of the electrical signals at an output of the switch, the electrical switch operable to provide only the subset of the electrical signals at its output as subscribed to by the customer, and
- a downstream electrical-optical converter, coupled to the switch at the central location, for converting the subset of electrical signals into a single downstream optical signal propagated over the optical fiber at a first optical wavelength.

14. The transmitter as recited in claim 13 to further transmit second electrical signals from the central location to the customer's premises, the downstream electrical-optical converter being adapted for receiving the second electrical signals at its input and for changing the downstream optical signal in correspondence to the second electrical signals.

15. The transmitter as recited in claim 14 wherein the downstream electrical-optical converter includes
- a downstream radio-frequency (RF) combiner for receiving the parallel subset of modulated electrical signals and the second electrical signals and for combining each of the modulated electrical signals in the subset and each of the second electrical signals to a pre-determined frequency band to produce a single downstream electrical signal, and
- a downstream laser operating at the first wavelength, coupled to the downstream RF combiner, for generating the downstream optical signal from the single downstream electrical signal.

16. The transmitter as recited in claim 15 wherein the downstream electrical-optical converter includes a downstream wave division multiplexer, coupled to the downstream laser and the optical fiber, for multiplexing the downstream optical signal onto the optical fiber.

17. The transmitter as recited in claim 16 for receiving an upstream optical signal being propagated upstream on the fiber at a second optical wavelength, the transmitter further including
- an upstream optical-electrical converter, and
- wherein the downstream wave division multiplexer is further arranged as a wave division demultiplexer for delivering the upstream optical signal to the upstream optical-electrical converter.

18. The transmitter as recited in claim 17 wherein the upstream optical-electrical converter includes a photodetector.

19. A receiver, located at a customer's premises, for detecting a downstream optical signal propagating at a first optical wavelength over an optical fiber connecting a central location to the customer's premises, the downstream optical signal including a first subset of electrical signals and second electrical signals, and for propagating third electrical signals upstream on the optical fiber at a second optical wavelength, the third electrical signals being paired with the second electrical signals to produce bi-directional signals, the receiver comprising a downstream optical-electrical converter, coupled to the optical fiber, for detecting the downstream optical signal and for converting the detected downstream optical signal into electrical received versions of the subset of electrical signals and electrical detected versions of the second electrical signals for use by the customer, and an upstream electrical-optical converter for converting the third electrical signals into an upstream optical signal, and for transmitting the upstream optical signal over the optical fiber at the second wavelength.

20. The receiver as recited in claim 19 wherein the upstream electrical-optical converter includes an upstream radio-frequency (RF) combiner for receiving the third electrical signals and for modulating each of the third electrical signals to a pre-determined frequency band to produce a single upstream electrical signal, and an upstream laser operating at the second wavelength, coupled to the upstream RF combiner, for generating the upstream optical signal from the single upstream electrical signal.

21. The receiver as recited in claim 20 wherein the upstream electrical-optical converter includes an upstream wave division multiplexer, coupled to the upstream laser and the optical fiber, for multiplexing the upstream optical signal onto the optical fiber at the second wavelength.

22. The receiver as recited in claim 21 wherein the upstream wave division multiplexer is further arranged as a wave division demultiplexer for delivering the downstream optical signal to the downstream optical-electrical converter.

23. The receiver as recited in claim 22 wherein the downstream optical-electrical converter includes a photodetector.

24. A multiple-customer system for communicating a customer-dependent subset of electrical signals downstream between a central location and each of a plurality of customer's premises, the central location and each of the customer's premises being interconnected by a dedicated optical fiber, the system comprising for each customer an electrical switch, at the central location, for receiving the electrical signals at an input of the switch and for delivering the subset of the electrical signals at an output of the switch, the electrical switch being controlled to provide only the subset of the electrical signals at its output as subscribed to by said each customer, a downstream electrical-optical converter, coupled to the switch at the central location, for converting the subset of electrical signals onto a single downstream optical signal propagated over the optical fiber at a first optical wavelength, and a downstream optical-electrical converter, coupled to the optical fiber at said each customer's premises, for detecting the downstream optical signal and for converting the detected downstream optical signal into electrical received versions of the subset of electrical signals for use by said each customer.

25. The system as recited in claim 24 to further transmit second electrical signals between the central location and said each customer, the downstream electrical-optical converter being adapted for receiving the second electrical signals at its input and for changing the downstream optical signal in correspondence to the second electrical signals, and the downstream optical-electrical converter being adapted for converting the detected downstream optical signal into second electrical received versions of second electrical signals for use by said each customer.

26. The system as recited in claim 25 further including an upstream electrical-optical converter, at said each customer's premises, for converting third electrical signals into an upstream optical signal, and for transmitting the upstream optical signal over the optical fiber at a second optical wavelength, and wherein the central location further includes an upstream optical-electrical converter for detecting the upstream optical signal and for converting the upstream optical signal to detected electrical versions of the third electrical signals.

27. The system as recited in claim 26 wherein the downstream electrical-optical converter includes a downstream radio-frequency (RF) combiner for receiving the parallel subset of modulated electrical signals and the second electrical signals and for combining each of the modulated electrical signals in the subset and each of the second electrical signals to a pre-determined frequency band to produce a single downstream electrical signal, and a downstream laser operating at the first wavelength, coupled to the downstream RF combiner, for generating the downstream optical signal from the single downstream electrical signal.

28. The system as recited in claim 27 wherein the downstream electrical-optical converter includes a downstream wave division multiplexer, coupled to the downstream laser and the optical fiber, for multiplexing the downstream optical signal onto the optical fiber.

29. The system as recited in claim 28 wherein the upstream electrical-optical converter includes an upstream radio-frequency (RF) combiner for receiving the third modulated electrical signals and for combining each of the third modulated electrical signals to a pre-determined frequency band to produce a single upstream electrical signal, and an upstream laser operating at the second wavelength, coupled to the upstream RF combiner, for generating the upstream optical signal from the single upstream electrical signal.

30. The system as recited in claim 29 wherein the upstream electrical-optical converter includes an upstream wave division multiplexer, coupled to the upstream laser and the optical fiber, for multiplexing the upstream optical signal onto the optical fiber.

31. The system as recited in claim 30 wherein the upstream wave division multiplexer is further arranged as a wave division demultiplexer for delivering the downstream optical signal to the downstream optical-electrical converter.

32. The system as recited in claim 30 wherein the downstream wave division multiplexer is further arranged as a wave division demultiplexer for delivering the upstream optical signal to the upstream optical-electrical converter.

33. The system as recited in claim 30 wherein the downstream optical-electrical converter includes a photodetector.

34. The system as recited in claim 30 wherein the upstream optical-electrical converter includes a photodetector.

35. A communication system for communicating a plurality of electrical signals from a central office to each of a plurality of subscribers' premises over a corresponding dedicated optical fibers comprising a first electrical switching device for selectively passing a first subset of the plurality of electrical signals, a first optical communication circuit, coupled to the first switching device, for transmitting the first subset of the electrical signals as a first optical signal over a first one of the optical fibers to a first one of the subscribers, a receiver located at the first subscriber premises, coupled to the first optical fiber, for converting the first subset transmitted as the first optical signal into electrical signals, a second electrical switching device for selectively passing a second subset of the plurality of electrical signals, a second optical communication circuit, coupled to the second switching device, for transmitting the second subset of the electrical signals as a second optical signal over a second one of the optical fibers to a second one of the subscribers, and a receiver located at the second subscriber premises, coupled to the second optical fiber, for converting the second subset transmitted as the second optical signal into electrical signals.

36. The system of claim 35 further comprising a laser transmitter, coupled to the first optical fiber and located at the first subscriber premises, for transmitting information over the first optical fiber to the central office.

37. The system of claim 35 further comprising a laser transmitter, coupled to the second optical fiber and located at the second subscriber premises, for transmitting information over the second optical link to the central office.

38. A system for communicating a subset of signals downstream between a central location and a customer's premises, the central location and the customer's premises being interconnected by a dedicated optical fiber, the system comprising an electrical switch, at the central location, for receiving the signals at an input of the switch and for delivering the subset of the signals at an output of the electrical switch, the electrical switch operable to provide only the subset of the signals at its output as subscribed to by the customer, a downstream electrical-optical converter, coupled to the switch at the central location, for converting the subset of signals onto a single downstream optical signal propagated over the optical fiber, and a downstream optical-electrical converter, coupled to the optical fiber at the customer's premises, for detecting the downstream optical signal and for converting the detected downstream optical signal into electrical received versions of the subset of signals for use by the customer.

39. The system as recited in claim 38, further comprising additional fiber optic lines and additional customer premises, each of said additional customer premises being coupled to said central office by at least one of said additional fiber optic lines, each of said additional fiber optic lines carrying signals between only one of said additional customer premises and said central office.

40. The system as recited in claim 38 further including an upstream electrical-optical converter, at the customer's premises, for converting second electrical signals into an upstream optical signal, and for transmitting the upstream optical signal over the optical fiber at a second optical wavelength, and wherein the central location further includes an upstream optical-electrical converter for detecting the upstream optical signal and for converting the upstream optical signal to detected electrical versions of the second electrical signals.

41. The system as recited in claim 40 wherein the downstream optical converter includes a downstream wave division multiplexer, coupled to the downstream laser and the optical fiber, for multiplexing the downstream optical signal onto the optical fiber.

42. The system as recited in claim 41 wherein the upstream electrical-optical converter includes
an upstream radio-frequency (RF) combiner for receiving the second modulated electrical signals and for combining each of the second modulated electrical signals to a pre-determined frequency band to produce a single upstream electrical signal, and
an upstream laser operating at the second wavelength, coupled to the upstream RF combiner, for generating the upstream optical signal from the single upstream electrical signal.

43. The system as recited in claim 42 wherein the upstream electrical-optical converter includes an upstream wave division multiplexer, coupled to the upstream laser and the optical fiber, for multiplexing the upstream optical signal onto the optical fiber.

44. The system as recited in claim 43 wherein the upstream wave division multiplexer is further arranged as a wave division demultiplexer for delivering the downstream optical signal to the downstream optical-electrical converter.

45. The system as recited in claim 43 wherein the downstream wave division multiplexer is further arranged as a wave division demultiplexer for delivering the upstream optical signal to the upstream optical-electrical converter.

46. The system as recited in claim 43 wherein the downstream optical-electrical converter includes a photodetector.

47. The system as recited in claim 43 wherein the upstream optical-electrical converter includes a photodetector.

48. A method for communicating a subset of electrical signals downstream between a central location and a customer's premises, the central location and the customer's premises being interconnected by a dedicated optical fiber, the method comprising the steps of switching at the central location the electrical signals received at an input to a switch to deliver the subset of the electrical signals at an output of the switch by controlling the switch to provide only the subset of the electrical signals at the output of the switch as subscribed to by the customer, converting, at the central location, the subset of electrical signals into a single downstream optical signal for propagation over the optical fiber at a first optical wavelength, and converting, at the customer's premises, the downstream optical signal propagated over the optical fiber into electrical received versions of the subset of the electrical signals for use by the customer.

49. The method as recited in claim 48 to further transmit second electrical signals between the central location and the customer's premises, the step of converting, at the central location, further including the steps of receiving the second electrical signals and for changing the downstream optical signal in correspondence to the second electrical signals, and the step of converting, at the customer's premises, further including the step of transforming the downstream optical signal into second electrical received versions of the second electrical signals for use by the customer.

50. The method as recited in claim 49 further including the steps of converting, at the customer's premises, third electrical signals into an upstream optical signal, transmitting the upstream optical signal over the optical fiber at a second optical wavelength, and converting, at the central location, the upstream optical signal into detected electrical versions of the third electrical signals.

51. A method of communicating information between an information provider and at least one subscriber premises comprising the steps of configuring a plurality of communication pathways to transmit information, operating a first electrical switching device located at the information provider to selectively pass information transmitted on a subset of the communication pathways and to block information included on at least one of the communication pathways, transmitting the information passed by the first switching device to the first subscriber premises as an optical signal using a first optical pathway positioned between the switching device and the first subscriber location, and converting information passed to the first subscriber premises as the optical signal into an electrical signal.

52. The method of claim 51 further comprising the step of transmitting information from the first subscriber to the information provider using the first optical pathway and an optical transmitter located at the first subscriber premises.

53. The method of claim 51 further comprising the steps of operating a second electrical switching device located at the information source to selectively pass information to a second subscriber premises transmitted on a subset of the communication pathways and to block information included on at least one of the communication pathways, at least some of the information passed by the second switching device being different than the information passed by the first switching device, transmitting the information passed by the second switching device to the second subscriber premises as a second optical signal using a second optical pathway positioned between the switching device and the second subscriber location, and converting information passed to the second subscriber premises as the second optical signal into an electrical signal.

54. The method of claim 53 further comprising the step of transmitting information from the second subscriber to the information provider using the second optical pathway and another optical transmitter located at the second subscriber premises.

55. A communications system, comprising:

a first electrical switch for receiving a plurality of signals and outputting a first subset of signals to be supplied to a first customer premises, said first subset of signals including fewer than all of said plurality of signals;

a first electrical to optical converter for modulating said first subset of electrical signals onto a first optical signal;

a first fiber optic line coupled to said electrical to optical converter for communicating signals corresponding to a single subscriber premises, said first optical signal being transmitted over said fiber optic line; and an optical to electrical conversion means for converting said first optical signal into a received first subset of electrical signals, said received first subset of electrical signals being available for use at said first customer premises.

56. The communication system of claim 55, further comprising:

an electrical signal combiner for combining electrical telephone signals to be supplied to the first customer premises with said first subset of signals prior to said signals being supplied to the first electrical to optical converter.

57. The communication system of claim 56, wherein said optical to electrical conversion means is located at said first customer premises, the system further comprising:

an electrical to optical converter, also located at said first customer premises, for converting electrical telephone signals into an optical signal transmitted over said first fiber optic line.

58. The communication system of claim 56, further comprising:

a second electrical switch for receiving said plurality of signals and outputting a second subset of signals to be supplied to a second customer premises, said second subset of signals including fewer than all of said plurality of signals and being different from said first subset of signals;

a second electrical to optical converter for modulating said second subset of electrical signals onto a second optical signal;

a second fiber optic line coupled to said second electrical to optical converter for communicating signals corresponding to a single subscriber premises, said second optical signal being transmitted over said second fiber optic line; and a second optical to electrical conversion means for converting said second optical signal into a received second subset of electrical signals, said received second subset of electrical signals being available for use at said second customer premises.

59. The communication system of claim 58, wherein said first subset of signals includes at least one unencrypted analog video signal corresponding to a premium video channel which is subscribed to by a service subscriber corresponding to said first customer premises, said second subset of signals not including said at least one unencrypted analog video signal.

60. The communication system of claim 55, further comprising:

an electrical signal combiner for combining electrical telephone signals to be supplied to the first customer premises with said first subset of signals prior to said signals being supplied to the first electrical to optical converter.

* * * * *